July 14, 1970     F. KILCHER     3,520,096
BEARING BETWEEN PARTS OF A BUILDING
Filed July 5, 1967
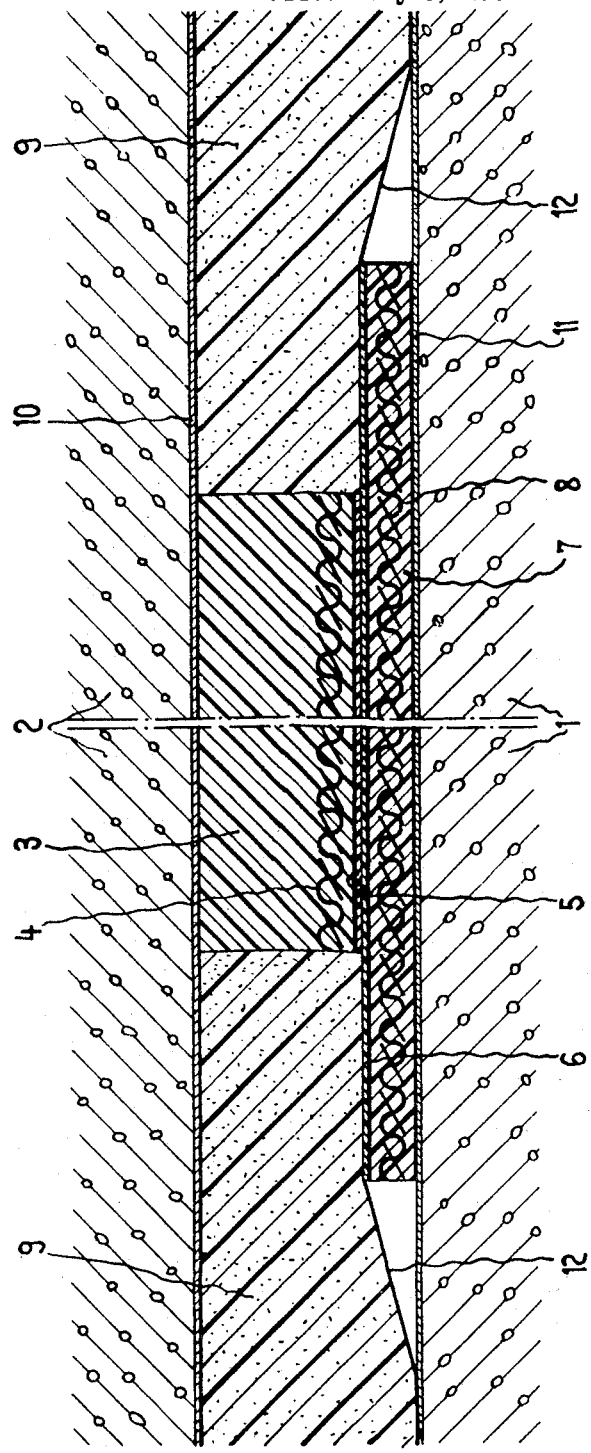
INVENTOR
Fredi Kilcher
BY

3,520,096
BEARING BETWEEN PARTS OF A BUILDING
Fredi Kilcher, 6 Berthastrasse, 4500
Solothurn, Switzerland
Filed July 5, 1967, Ser. No. 651,230
Claims priority, application Switzerland, July 20, 1966,
10,500/66
Int. Cl. E04b *1/36;* E01d *19/04*
U.S. Cl. 52—396                                          4 Claims

ABSTRACT OF THE DISCLOSURE

A bearing assembly adapted to be inserted between parts of a building for taking up relative movements of the building parts, comprising thin sliding layers of plastics material such as Teflon applied to an elastic bearing pad and a flexible carrying layer respectively, layers of reinforcing material such as fabrics imbedded in said bearing pad and carrying layer near said sliding layers, the whole assembly being flexible to a degree allowing rolling of tapes thereof, but said reinforcing material preventing deformation of said sliding layers transversely to the load transmitted through the bearing assembly.

---

This invention relates to a bearing between parts of a building, particularly building parts of concrete, having an elastically deformable bearing body and two sliding layers made of plastics material and lying upon each other, of which the one has a smaller area and is connected to the bearing body, while the other sliding layer is connected to a carrying layer contacting directly the bearing surface of the one building part and having substantially smaller thickness than the bearing body.

In a prior bearing of this type the bearing body is made of a number of stacked elements stiffened each by metal sheets at each side, whereby the one sliding layer is connected to the metal sheet of the lowest element of the bearing body while the other, bigger sliding layer is also connected with a metal sheet disposed between it and the lower part of the building. With this structure, some conditions for perfect sliding of the sliding layers upon each other and high life time of the bearing are fulfilled, such conditions being that the sliding layers should not expand in their plane under the load and that they should not appreciably be deformed in the direction of the load transmitted through them. Both effects would occur if the sliding layers were disposed on too soft, deformable carriers, for instance bearing bodies. In each case wave- or foldlike unevenness are formed particularly in the sliding layer of greater area, whereby sliding of the layers is injured and the sliding surfaces are destroyed. In the above prior bearing this disadvantage is avoided by application of the sliding layers onto practically rigid metal sheets. Besides of the fact, that sufficiently strong connection of these metal sheets to the sliding layers and to the bearing bodies respectively is difficult and in any case complicated, the bearing is rendered stiff by these metal sheets, whereby handling of the bearings during their manufacture, transport and application is rendered difficult, and the use of these bearings is practically limited to local plate-shaped bearing pads. During application of the bearing and when it is applied on site, the sliding surfaces, and particularly the laterally projecting portions of the sliding layer of bigger area are not protected, whereby the sliding properties may rapidly be destroyed in use.

This invention aims in providing a bearing having the desired properties of the above prior bearing without having at the same time its disadvantages. The bearing according to this invention is broadly characterized in that the bearing body and the carrying layer are made of an elastically flexible material and are reinforced against expansion transversely to the direction of the load in immediate proximity of the sliding layer, and that the carrying layer remains practically without elastical deformation in the direction of the load and only compensates roughness of the bearing surface such that the surface of the carrying layer equipped with the sliding layer is at least approximately plane. By the reinforcement, preferably a fabric reinforcement, in immediate proximity of the sliding layers any expansions of the same in their plane are avoided whereby flexibility and the practically important possibility to roll tapes or strips of the bearing are obtained. Hereby all parts of the bearing may preferably be assembled to a unit together with filling bodies of smaller strength, this unit allowing easy transport and application on site and in which the sliding layers are completely enclosed and protected. The material and the thickness of the said carrying layer are so designed that this layer may be considered as being substantially rigid with the specific pressures to be transmitted through it, that is practically no deformation of this carrying layer and of the sliding layer connected thereto occurs under the pressures acting on it. On the other hand the carrying layer lying on the bearing surface of the one building part has the effect that the roughness of the bearing surface which cannot practically be avoided with building parts of concrete, is not transmitted to the sliding layer. In other words the carrying layer shall be so rigid that it prevents deformation of the sliding layer connected thereto under normal conditions in use but that it is sufficiently flexible for prefabrication and dispatch of the bearing.

In the following the invention will be explained in more detail with reference to an embodiment illustrated by way of example in the accompanying drawing.

The figure of the drawing is a sectional view of the bearing assembly between parts of a building.

The illustrated bearing is shown in its conditions of use as inserted between a lower part of concrete 1 and an upper part of concrete 2. The bearing has a bearing body 3, made for instance of neoprene or the like material. A fabric 4 or a layer of fibres acting as a reinforcement is vulcanized into the lower side of the bearing body 3. To this reinforced lower side of the bearing body 3 is cemented a sliding layer 5 of another plastics material having a very low coefficient of friction, for instance Teflon. The sliding layer 5 lies on a larger lower sliding layer 6 of the same material. The sliding layer 6 is cemented to a carrying layer 7. The carrying layer 7 is also provided with a reinforcement 8 of fabric or fibres in immediate proximity of the sliding layer 6. The carrying layer 7 may be made of the same material as the bearing body 3, but the carrying layer 7 is appreciably thinner so that it undergoes practically no compression and consequently also no transverse expansion under the acting pressure.

At the side of the bearing body 3 filling bodies 9 of a relatively light foam of plastics material are disposed of which the strength is practically without importance compared with the strength of the bearing body. The filling bodies 9 may be made of a material known under the trade name Styropor. The bearing body 3 and the filling bodies 9 are connected to a common carrier of sheet material, for instance a paper tape 10. On the top of the sliding layer 6 which laterally projects from the bearing body 3, and of which the thickness generally corresponds to the total thickness of the bearing body 3, the sliding layers 5 and 6 of the carrying layer 7, are slightly compressed. The carrying layer 7 is connected to a second carrier 11 of sheet material, for instance a paper tape, of which both rims are connected to the lower side of the filling bodies 9. The filling bodies 9 are not connected to the sliding layer 6 and to the paper tape 11 in an intermediate zone 12. However, the rims of the paper tape 11 are connected to the filling bodies 9 so that the whole bearing assembly covered at its upper and lower side by the paper tapes 10 and 11 may be transported and applied on site as a tape-shaped unit.

As an example, the particular parts of the bearing have the following thicknesses:

|  | Mm. |
|---|---|
| Neoprene bearing 3 | 5 to 14 |
| Teflon-sliding layers 5 and 6 | .1 to .2 |
| Neoprene-carrying layer 7 | 1 to 2 |

The effect and operation of the illustrated bearing is as follows:

The vertical pressure from the upper building part 2 to the lower building part 1 is transmitted practically exclusively by the bearing body 3. The carrying layer 7 is so designed that with the usual specific pressures practically no deformation of this layer and of the sliding layer 6 connected thereto occurs, so that the upper sliding surface of the sliding layer 6 is practically plane. On this plane sliding layer the upper sliding layer 5 may slide with a very low coefficient of friction when the upper building part 2 expands or contracts relatively to the lower building part 1 in horizontal direction. The width of the lower sliding layer 6 is so dimensioned that for all practical cases the upper sliding layer 5 still completely lies on the lower sliding layer 6.

With relatively high vertical pressures the bearing body 3 undergoes a certain expansion in horizontal direction. However, this expansion has no effect or a very unsignificant effect on the upper sliding layer 5 due to the reinforcement 4, so that no expansion of the upper sliding layer 5 beyond its elastic limit occurs and consequently no production of folds may occur when the pressures subsequently decrease.

Upon horizontal displacement of the upper building part 2 relatively to the lower building part 1 the upper sliding layer 5 slides on the lower sliding layer 6. The filling bodies 9 are hereby somewhat compressed and deformed at the side of the bearing body 3. The forces acting in this case are insignificant compared with the remaining forces.

When the bearing surfaces of the upper and lower building parts are not exactly plane-parallel the bearing body 3 is somewhat deformed accordingly, whereas the sliding layers 5 and 6 and the carrying layer 7 remain without deformation.

Application of the illustrated bearing is effected in that the prepared bearing assembly with its filling bodies 9 is positioned onto the plane bearing surface of the lower building part 1. Thereby the tape-shaped prefabricated bearing is so designed that it completely covers the bearing surface of the lower building part 1. Afterwards the upper building part 2 is cast on site whereby the filling bodies 9 are sufficiently strong for taking up the hydrostatic pressure of the cast concrete. After setting of the upper building part 2 and removal of the sheathing for the same the bearing body 3 takes up the pressure of the upper building part as already described above.

This invention is not limited to a strip-shaped prefabricated bearing of the illustrated type but it is also applicable for individual local bearings. When the upper building part 2 is not cast on site the filling bodies 9 are not required and the paper tapes 10 and 11 may be omitted.

What is claimed:

1. A bearing assembly between parts of a building, particularly building parts of concrete, comprising an elastically deformable bearing body and two sliding layers of plastics material and lying upon each other, of which the one has a smaller area and is connected to the bearing body, while the other sliding layer of bigger area is connected to a carrying layer contacting directly the bearing surface of the one building part and having substantially smaller thickness than the bearing body, said bearing body and the carrying layer being made each of flexible material with a layer of flexible reinforcing material against expansion transversely to the direction of the load imbedded in said bearing body and carrying layer in immediate proximity of the respective sliding layers, the thickness of said reinforcing material in said bearing body being substantially less than the thickness of the bearing body so that a substantial thickness of the bearing body remote from said sliding layers is free to expand transversely, the carrying layer remaining practically without elastic deformation in the direction of the load but only compensates roughnesses of the bearing surface such that the surface of the carrying layer adjacent its sliding layer is at least approximately plane.

2. A bearing assembly between parts of a building, particularly building parts of concrete, comprising an elastically deformable bearing body and two sliding layers of plastic material and lying upon each other, of which the one has a smaller area and is connected to the bearing body, while the other sliding layer is connected to a carrying layer contacting directly the bearing surface of the one building part and having substantially smaller thickness than the bearing body, said bearing body and carrying layer being made each of flexible material with a layer of flexible reinforcing material against expansion transversely to the direction of the load imbedded in said bearing body and carrying layer in immediate proximity of the sliding layer, the carrying layer remaining practically without elastic deformation in the direction of the load but only compensates roughness of the bearing surface such that the surface of the carrying layer adjacent its sliding layer is at least approximately plane, filling bodies disposed at the sides of the bearing body in the plane of the same, a first common carrier of sheet material for the bearing body and the filling bodies, and a second carrier of sheet material interconnecting the carrying layer with the filling bodies, the portion of each filling body lying on said other sliding layer shiftably lies on this sliding layer and in a zone at the side of the same on the second carrier of sheet material.

3. A bearing assembly between parts of a building, particularly building parts of concrete, comprising an elastically deformable bearing body and two sliding layers of plastics material and lying upon each other, of which one has a smaller area and is connected to the bearing body, while the other sliding layer is connected to a carrying layer contacting directly the bearing surface of the one building part and having substantially smaller thickness than the bearing body, said bearing body and carrying layer being made each of flexible material with a layer of flexible reinforcing material against expansion transversely to the direction of the load imbedded in said bearing body and carrying layer in immediate proximity of the sliding layer, the thickness of said reinforcing material in said bearing body being substantially less than the thickness of the bearing body so that a substantial thickness of the bearing body remote from said sliding layer is free to expand transversely, the carrying layer remaining practically without elastic deformation in the direction of the load but only compensates roughnesses of the bearing surface such that the surface of the carrying layer adjacent its sliding layer is at least approximately plane, filling bodies disposed at the sides of the bearing body in the plane of the same, a first common carrier of sheet material for the bearing body and the filling bodies and a second carrier of sheet material interconnecting the carrying layer with the filling bodies.

4. A bearing assembly between parts of a building, particularly building parts of concrete, comprising an elastically deformable bearing body and two sliding layers of plastics material and lying upon each other, of which the one has a smaller area and is connected to the bearing body, while the other sliding layer is connected to a carrying layer contacting directly the bearing surface of the one building part and having substantially smaller thickness than the bearing body, said bearing body and the carrying layer being made each of flexible material with a layer of flexible reinforcing material against expansion transversely to the direction of the load imbedded in said bearing body and carrying layer in immediate proximity of the sliding layer, the thickness of said reinforcing material in said bearing body being substantially less than the thickness of the bearing body so that a substantial thickness of the bearing body remote from said sliding layers is free to expand transversely, the carrying layer remaining practically without elastic deformation in the direction of the load but only compensates roughness of the bearing surface such that the surfaces of the carrying layer adjacent to sliding layer is at least approximately plane, means interconnecting said bearing body, and carrying layer to form a combined closed structure wherein said sliding layers are protected between said bearing body, carrying layer and interconnecting means respectively.

References Cited

UNITED STATES PATENTS

| | | | |
|---|---|---|---|
| 3,218,008 | 11/1965 | Harris | 52—396 X |
| 3,243,236 | 3/1966 | Graham | 14—16 X |
| 3,301,609 | 1/1967 | Palfreyman | 14—16 X |
| 3,349,418 | 10/1967 | Hein | 14—16 |
| 3,354,594 | 11/1967 | Kilcher | 52—396 X |

ALFRED C. PERHAM, Primary Examiner

U.S. Cl. X.R.

161—49; 14—16; 248—22; 308—3